Patented June 17, 1941

2,246,030

UNITED STATES PATENT OFFICE 2,246,030

METHOD OF DISPERSING TITANIUM DIOXIDE PIGMENTS

Robert William Ancrum, Stockton-on-Tees, and Assur Gjessing Oppegaard, Eaglescliffe, England, assignors to Titan Company, Inc., Wilmington, Del., a corporation of Delaware No Drawing. Application September 3, 1938, Serial No. 228,326. In Great Britain September 18, 1937

6 Claims. (Cl. 134—58)

This invention relates to the manufacture of titanium dioxide pigments. It is concerned more particularly with the preparation of titanium dioxide pigments in a uniform and finely divided state.

It is known that titanium dioxide pigments, prepared in accordance with the usual, well-known processes of hydrolysis and calcination, on calcination tend to form sintered aggregates or coarse particles which cannot be removed completely by the usual dry grinding processes.

United States Patent No. 2,084,917 to Nelson describes a process for the removal of such coarse particles from calcined titanium dioxide by suspending the pigment in water, which contains or to which is added certain dispersing agents of an acidic nature, and, after dispersion, separating the coarse fraction from the finer, dispersed fraction. The dispersion agents used are the halides of trivalent or tetravalent elements, which yield a clear or only slightly turbid solution when dissolved in water, examples of such substances being aluminum chloride, cerium chloride, ferric chloride, titanium chloride, zirconium chloride, thallium chloride and thorium chloride. It is stated that aluminum chloride (AlCl$_3$) is particularly suitable.

We have now found that the dispersion of the titanium dioxide pigment can be improved by using a solution of a basic halide instead of a normal halide, the process for the separation of calcined titanium dioxide pigments into particles of different sizes in accordance with the present invention thus comprises dispersing the calcined pigment in water in the presence of or in admixture with a basic halide and effecting the separation in any convenient manner, e. g. by hydroseparation. Suitable dispersing agents for use in our invention include the basic halides, e. g., the chlorides and bromides of aluminum, iron, cerium, titanium, zirconium, thallium and thorium. Of these a solution of basic aluminum chloride is found to be particularly useful in the process of the present invention.

By "a solution of a basic halide" is to be understood a solution which contains less of the halogen component than is theoretically necessary to form the normal halide with the metal present in the solution, the term "basic" being used with reference to the relative proportions of the halogen and the metal and having no reference to the pH value of the solution. These salts may be prepared according to the methods of A. Müller (J. für anorgan Chemie, vol. 57, year 1908, page 311 et seq.); M. Adolf and W. Pauli (Kolloid-Journal, vol. 29, year 1921, part 6, page 282 et seq.); Gmelin "Handbuch der Anorganische Chemie," 8th edition, delivery I, part B, pages 205–206; or "Bulletin de la Société Chemique de France" 3rd series, volume 13, year 1895, page 56.

For example, solutions of basic aluminum chloride having a basicity up to 60% or more may be readily formed by dissolving aluminum hydroxide or strongly basic aluminum sulphate in hydrochloric acid. A basicity of 60% or more means that the solution contains only 40% or less of that amount of Cl which is theoretically required for the formation of the normal salt (AlCl$_3$) with the aluminum present in the solution. Various impurities, such as soluble sulphates, tend to counteract the dispersing effect and the solution should not contain any appreciable amount of such substances. If, for instance, aluminum hydrate used in the production of the solution contains SO$_4$ ions, it is advisable to add to the solution an amount of barium chloride equivalent to the SO$_4$ content, in order to precipitate the SO$_4$ ions as BaSO$_4$, which can be easily removed by filtration or sedimentation, and thus leave Cl ions instead of SO$_4$ ions.

It has been found that the stability of the pigment suspensions increases with increasing basicity of the solution.

The dispersion of the titanium dioxide pigment may be effected in any convenient manner which brings about a thorough mixing of the pigment particles and the aqueous dispersion media. Thus, ball-milling or mechanical agitation are effective methods. According to the invention it is possible to prepare suspensions of pigments containing as much as about 250 grams of pigment per liter of aqueous dispersing media or as little as about 50 grams per liter. For practical purposes, however, it will be found desirable to work with suspensions containing between about 150 grams and about 220 grams of pigment per liter. The quantity of dispersing agent required according to the invention may also vary within certain limits. Thus, it has been found that satisfactory dispersions can be prepared using as little as about 0.1 part of dispersing agent, calculated as the metal oxide, per 100 parts pigments. In general, however, the amount of dispersing agent required will be found within the range of from about 0.1–1.0 part dispersing agent, calculated as the metal oxide per 100 parts of pigment. In the case of using basic aluminum chloride as dispersing agent, the amount of same required will normally be found within the range of about 0.1–0.4 part dispersing agent calculated as $Al_2O_3$ per 100 parts of pigment. It will be seldom necessary to exceed about 2.5 parts of dispersing agent, similarly calculated per 100 parts of pigment.

After the pigment is dispersed with the solution of basic halide, the suspension is left for a sufficient time to enable the coarse particles to separate from the fines by settling, and the supernatant dispersion of the fine particles is then decanted, or, in a continuous process, taken into another tank by overflow. A flocculating agent is added to the dispersion in order to coagulate the fine pigment particles which then are separated by settling and filtration. A suitable flocculating agent is ammonia added in a quantity sufficient to give a pH value of 7.0 to the dispersion. Other flocculating agents like salts of divalent metals, for example, magnesium sulphate can be used.

Our invention, as distinguished from the use of normal acid reacting halides, lies particularly in the fact that by the use of basic halides more stable suspensions are obtained. Thus, for example, we have found that a titanium dioxide pigment which has been calcined in the presence of a small amount of phosphoric acid and a small amount of potassium carbonate when dispersed with normal aluminum chloride yields a suspension which settles in about one hour to leave a clear, supernatant liquor. On the other hand, when using the same pigment and a solution of aluminum chloride of 60% basicity, the dispersion remains stable for a very long time, 70% of the pigment being still dispersed after ten hours. It is, therefore, obvious that our invention permits easier handling of materials and a longer storage period, when necessary, between the dispersion step and the separation of the finer particles from the coarser particles. It is apparent that a closer separation of the pigment of the desired particle size may be made, since adequate time for the removal of coarse pigment without undue settling of fine particles becomes available. To this extent, therefore, our present invention is to be considered as an improvement in methods for dispersing titanium pigments by means of acid reactive metal halides.

Similar results are also obtained when using a titanium dioxide pigment calcined with addition of about 1% of antimony oxide and about 0.35% of potassium carbonate. Here the normal aluminum chloride gives no dispersion at all, immediate flocculation occurring. The same is true of the results obtained when using an aluminum chloride solution of 25% basicity. If, however, an aluminum chloride solution of 50% basicity is employed a fair dispersion is obtained, which becomes better as the basicity is increased to 60%. In this latter case more than 50% of the pigment remains in dispersion after ten hours settling.

The process of our present invention is illustrated by the following specific example.

*Example I*

Calcined titanium oxide containing about 98% $TiO_2$ was passed through a mill to break up the larger lumps formed during calcination. It was then stirred with water to form a 20% suspension of the pigment in water. A solution of aluminum chloride of 60% basicity was then added in an amount corresponding to 0.3% $Al_2O_3$, calculated on the pigment present. The pigment was dispersed by the solution of basic aluminum chloride and the dispersed suspension was passed slowly through a tank to separate the remaining coarse particles from the fines by hydroseparation. The over-flow containing 80% of the total pigment was taken into another tank, heated to 65° C., and ammonia added in an amount sufficient to increase the pH value of the suspension to 7.0. As a result the fine pigment was coagulated and settled out and, after settling, was filtered, washed and dried. After drying, the pigment was taken into a disintegrator to break up loose aggregates formed during flocculation and drying.

The coarse fraction which settled out in the dispersion tank was returned to the mill and treated theretogether with a fresh charge of calcined titanium pigment, the mixture dispersed and the treatment described was again followed.

*Example II*

Calcined titanium oxide containing about 98% $TiO_2$ was passed through a mill to break up the larger lumps formed during calcination. It was then stirred with water to form a 20% suspension of the pigment in water. A solution of titanium chloride of about 70% basicity was then added in an amount corresponding to 0.6–0.7% $TiO_2$ calculated on the pigment present. The pigment was dispersed by the solution of basic titanium chloride and the dispersed suspension was taken slowly through a tank and treated further as described in Example I.

The dispersion obtained with the basic titanium chloride was very stable and considerably better than when a solution of titanium tetrachloride was used.

In certain circumstances it may be advisable to grind the pigment in the mill in the presence of the dispersing agent.

The foregoing description and example of our invention has been given merely for clearness of understanding and no undue limitations should be deduced therefrom, but the appended claims should be interpreted as broadly as possible in view of the prior art.

We claim:

1. An improved method for dispersing titanium dioxide pigments in aqueous media which comprises intimately mixing particles of said pigment with water and a relatively small amount of a basic halide of an element selected from the group consisting of aluminum, cerium, iron, titanium, zirconium, thallium and thorium, allowing the coarse particles to settle out of suspension and separating therefrom the supernatant aqueous suspension of the dispersed finer particles.

2. An improved method for dispersing titanium dioxide pigments in aqueous media which comprises intimately mixing particles of said pigment with water and an amount of a basic halide of an element selected from the group consisting of aluminum, cerium, iron, titanium, zirconium, thallium and thorium between about 0.1 part to about 2.5 parts, calculated as the oxide of said element per 100 parts of pigment, allowing the coarse particles to settle out of suspension, separating therefrom the supernatant aqueous suspension of the dispersed finer particles, adding to said suspension of finer particles a small amount of a coagulating agent to precipitate the said finer particles and separating them from the supernatant liquid.

3. An improved method for dispersing titanium dioxide pigments in aqueous media which comprises intimately mixing particles of said pigment with water and an amount of a basic aluminum halide between about 0.1 part to about 2.5 parts, calculated as $Al_2O_3$ per 100 parts of pigment, allowing the coarse particles to settle out of suspension, separating therefrom the supernatant aqueous suspension of the dispersed finer particles, adding to said suspension of finer particles a small amount of a coagulating agent to precipitate the finer particles and separating them from the supernatant liquid.

4. An improved method for dispersing titanium dioxide pigments in aqueous media which comprises intimately mixing particles of said pigment with water and an amount of a basic aluminum chloride between about 0.1 part and 0.4 part, calculated as $Al_2O_3$ per 100 parts of pigment, allowing the coarse particles to settle out of suspension, separating therefrom the supernatant aqueous suspension of the dispersed finer particles, adding to said suspension a small amount of ammonia to precipitate the said finer particles and separating them from the supernatant liquid.

5. An improved method for dispersing titanium dioxide pigments which have been calcined in admixture with antimony oxide which comprises intimately mixing particles of said pigment with water and an amount of a basic aluminum halide having a basicity of about 50 percent, between about 0.1 part to about 2.5 parts, calculated as $Al_2O_3$ per 100 parts of pigment, allowing the coarse particles to settle out of suspension, separating therefrom the supernatant aqueous suspension of the dispersed finer particles, adding to said suspension of finer particles a small amount of a coagulating agent to precipitate the finer particles and separating them from the supernatant liquid.

6. An improved method for dispersing titanium dioxide pigments which have been calcined in admixture with potassium carbonate which comprises intimately mixing particles of said pigment with water and an amount of a basic aluminum halide having a basicity of about 50 percent, between about 0.1 part to about 2.5 parts, calculated as $Al_2O_3$ per 100 parts of pigment, allowing the coarse particles to settle out of suspension, separating therefrom the supernatant aqueous suspension of the dispersed finer particles, adding to said suspension of finer particles a small amount of a coagulating agent to precipitate the finer particles and separating them from the supernatant liquid.

ROBERT WILLIAM ANCRUM.
ASSUR GJESSING OPPEGAARD.